United States Patent
Fay

(10) Patent No.: US 11,017,814 B2
(45) Date of Patent: May 25, 2021

(54) LIVE AND POST WORKFLOW SYSTEM AND METHOD

(71) Applicant: Todor Fay, La Jolla, CA (US)

(72) Inventor: Todor Fay, La Jolla, CA (US)

(73) Assignee: NewBlue, Inc., San Diego, CA (US)

( * ) Notice: Subject to any disclaimer, the term of this patent is extended or adjusted under 35 U.S.C. 154(b) by 0 days.

(21) Appl. No.: 16/901,178

(22) Filed: Jun. 15, 2020

(65) Prior Publication Data

US 2020/0312372 A1 Oct. 1, 2020

Related U.S. Application Data

(63) Continuation-in-part of application No. 16/186,364, filed on Nov. 9, 2018, now Pat. No. 10,734,028, (Continued)

(51) Int. Cl.

| | |
|---|---|
| *G11B 27/036* | (2006.01) |
| *H04N 21/262* | (2011.01) |
| *H04N 21/25* | (2011.01) |
| *H04N 21/854* | (2011.01) |
| *H04N 21/81* | (2011.01) |
| *G06F 40/186* | (2020.01) |
| *G11B 27/34* | (2006.01) |
| *H04N 21/431* | (2011.01) |

(Continued)

(52) U.S. Cl.
CPC .......... *G11B 27/036* (2013.01); *G06F 40/186* (2020.01); *G11B 27/34* (2013.01); *H04N 21/23406* (2013.01); *H04N 21/251* (2013.01); *H04N 21/26258* (2013.01); *H04N 21/4316* (2013.01); *H04N 21/44029* (2013.01); *H04N 21/4886* (2013.01); *H04N 21/8126* (2013.01); *H04N 21/8133* (2013.01); *H04N 21/854* (2013.01)

(58) Field of Classification Search
None
See application file for complete search history.

(56) References Cited

U.S. PATENT DOCUMENTS

| | | | | |
|---|---|---|---|---|
| 6,160,907 | A | * 12/2000 | Robotham | ............ G06T 13/00 345/419 |
| 2008/0271082 | A1 | * 10/2008 | Carter | ................ H04N 21/4858 725/51 |

(Continued)

*Primary Examiner* — Heather R Jones

(57) ABSTRACT

Embodiments of the invention relate a system and method of a live and post workflow for generating a media project of a live production media and fully reconstructing all graphical elements and all graphical events of the live production media for a post-production environment. The live and post workflow system including a live broadcasting component for controlling a live broadcast and recording, via a recorder, all media actions, including graphic data information and graphic events, but also all other components and actions required for the production, including video and audio filters, transitions, media clips, mix levels, and a converting phase component for processing and building a generic output from the one or more media files, user actions, and incoming data events and then translating and reconstructing the generic output into a complete reconstruction of the live broadcast having a generic output format and timeline that is supported by the post-production environment.

20 Claims, 12 Drawing Sheets

Related U.S. Application Data which is a continuation-in-part of application No. 15/967,235, filed on Apr. 30, 2018, now Pat. No. 10,446,191, which is a continuation-in-part of application No. 15/494,502, filed on Apr. 23, 2017, now Pat. No. 10,455,296, which is a continuation-in-part of application No. 15/441,160, filed on Feb. 23, 2017, now Pat. No. 9,830,948, which is a continuation of application No. 15/216,397, filed on Jul. 21, 2016, now Pat. No. 9,620,173.

(51) Int. Cl.
*H04N 21/4402* (2011.01)
*H04N 21/488* (2011.01)
*H04N 21/234* (2011.01)

(56) References Cited

U.S. PATENT DOCUMENTS

2018/0098099 A1* 4/2018 Kurani ............... H04N 21/4312
2020/0007615 A1* 1/2020 Brebner ................. H04L 67/10

* cited by examiner

LIVE AND POST WORKFLOW SYSTEM AND METHOD

RELATED APPLICATIONS

This application claims the benefit of priority of U.S. application Ser. No. 16/186,364, filed Nov. 9, 2018, which is a continuation-in-part of U.S. application Ser. No. 15/967,235, filed Apr. 30, 2018, which is a continuation-in-part of U.S. application Ser. No. 15/494,502, filed Apr. 23, 2017, which is a continuation-in-part of U.S. application Ser. No. 15/441,160, filed Feb. 23, 2017, which is a continuation of application Ser. No. 15/216,397, filed Jul. 21, 2016, which are herein incorporated by reference to the present application.

FIELD OF THE INVENTION

The present invention relates generally to a live and post workflow for generating a live production media and then completely reconstructing all of the elements of the production media in post-production. In particular, steps of the live and post workflow includes preparing the broadcast, live broadcasting and Recording, converting media, and an editing production.

BACKGROUND

In live production, streaming, and broadcast recordings, all video, audio, camera shots, images, and other graphical and media elements are captured real-time on a single timeline event. These live recordings may include a variety of media content ranging from live sports, news, and entertainment performances to video games and social media sharing. Once recorded and captured in a digital or analog content, the recorded content may be edited offline using a Non-linear editing system (NLE) using hardware or software platforms including specialized software such as, for example, Adobe's Premiere, Avid's Media Composer, and Magix Software's Vegas. In NLE systems, edits may be modified by the specialized software. An edit decision list (EDL) is generally supported by such software to keep track of edits. For example, every time a media clip, audio clip or video clip is accessed, it is reconstructed from the original recorded source. NLE systems have many advantages in making edits in post-production. However, these NLE systems generally lack the ability to make any adjustments or corrections to specific media elements from the live production video in post-production (i.e., incorrect text in a title card, cuts to the wrong camera, etc.).

What is highly desirable is a live recording system for generating a media project of a live production media and fully reconstructing all graphical elements and all graphical events of the live production media for a post-production environment using a single platform.

SUMMARY

One advantage of the present invention is to provide a live and post workflow system for generating a media project of a live production media and fully reconstructing all graphical elements and all graphical events of the live production media for a post-production environment, the live and The live and post workflow system including a live broadcasting component for controlling a live broadcast and recording, via a recorder, all media actions, including graphic data information and graphic events, but also all other components and actions required for the production, including video and audio filters, transitions, media clips, mix levels, etc., and a converting phase component for processing and building a generic output from the one or more media files, user actions, and incoming data events and then translating and reconstructing the generic output into a complete reconstruction of the live broadcast having a generic output format and timeline that is supported by the post-production environment.

Another advantage of the present invention is to provide a method for generating a media project of a live production media and fully reconstructing all graphical elements and all graphical events of the live production media for a post-production environment by a live and post workflow system, the method including recording, via a recorder, graphic data information and graphic events, including capturing all incoming video and audio to one or more media files, and recording all user actions and incoming data events that manipulate a plurality of production media components within the live and post workflow system; building a generic output from the one or more media files, user actions, and incoming data events; and translating and reconstructing the generic output into a complete reconstruction of the live broadcast having a generic output format and timeline that is supported by the post-production environment.

Benefits of this live and post workflow while preparing and working with motion graphics media, include: 1) Correcting mistakes from the live production video in post (i.e., incorrect text in a title card, cuts to the wrong camera, etc.); 2) Creating edited and condensed versions of the broadcast can be easily accomplished; 3) Offering the user a fast work flow for creating canned productions, such as tutorials, even when there is no intention to broadcast live.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
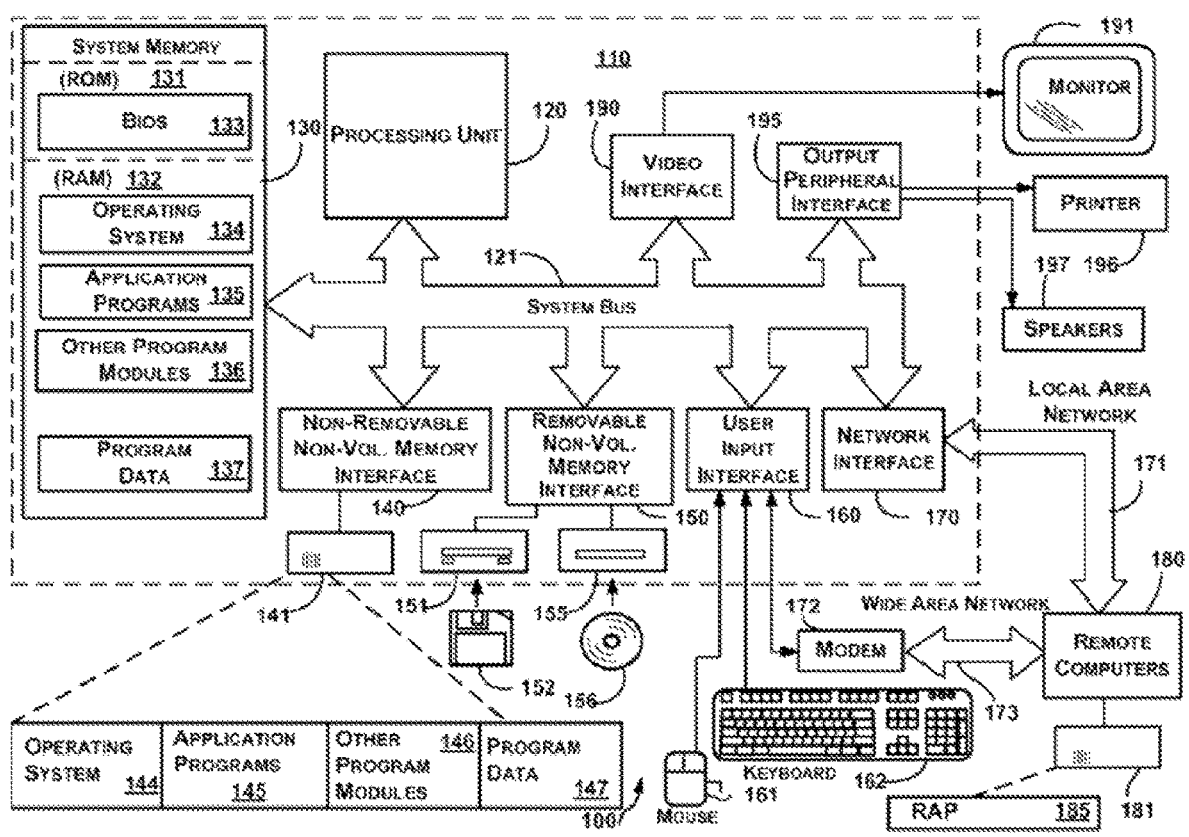
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

The computing environment 100 may include a system board 110 (alternatively known as the mainboard, motherboard, baseboard, planar board or logic board) which implemented on a printed circuit board (PCB). It provides communication between many of the electronic components of the system operating components, such as a central processing unit (CPU) and memory, and provides connectors for other peripherals. Hardware elements related to the system board 110 include, for example, memory components defined by a system memory using Read Only Memory ROM 131 and Random Access Memory RAM 132 circuitry, a central processing unit CPU 120 being defined by a microprocessing circuit, a system bus 121 having physical wiring bus elements to transfer binary data between each hardware components, and multiple external interfaces including a video interface 190, an output peripheral interface 195, non-removable and removable memory interfaces (140, 150), a user input interface 160, and a network interface 170. External hardware components of the system board 110 may include a display monitor 191, printer 196, speakers 197, keyboard 162, a pointing device or mouse 161, and a local area network 171 interfacing to remote computers 180. Software, programs data, and firmware may be applied to and installed on the system memories (131, 132) and provide instructions to operate the computing system 100. A BIOS 133 for providing a set of computer instructions in firmware that control input and output operations of the computer system 100 may be installed in the ROM 131. Applications related to software include an operating system OS 134, applications programs 135, other program software modules and drivers 136, and program data 137. Software may also be loaded and operated via storage devices such as hard drive 141, disk drive 151 via disk 152, and compact disk drive 155 via compact disk CD 156. The storage device may include and execute software such as an operating system 144, application programs 145, other program modules 146, and program data 147.

Aspects of the subject matter described herein are operational with numerous other general purpose or special purpose computing system environments or configurations.

Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants PDAs, gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

The computing system environment 100 may also have or may execute a variety of operating systems OS, including an operating system used on a desktop platform or a mobile operating system used mobile devices such as smartphones, cellular/mobile phone, tablets, personal digital assistance PDA, laptop computer, smart watches, and the like. The computing system environment 100 may also include or may execute a variety of possible applications or "Apps", such as music streamers/players, e-book readers, utility Apps, and electronic gaming apps. The application may provide connectivity and communication with other devices or a server over a network, such as communicating with another computer via a wired or wireless Internet or Intranet network for online interaction such as electronic gaming or online collaboration.

Live and Post Workflow System

Often it may be desirable to record a live video production and then edit it for playback later. One simple approach is to record the performance and then edit it later. However, this can be very constrained because all choices made during the live production cannot be undone. An obvious first step is to record all live video feeds directly, save the cut points in an edit decision list (EDL), and reconstitute the recorded video in editing software. However, this does not address the finer details of production, from title graphics to transition wipes.

It may also be desirable to run a live production and then completely reconstruct all of the elements of the production in post afterwards and do so with a seamless live and post workflow that enables complete non-destructive editing of all of the elements that constitute a fully produced program.

These elements in the live and post workflow include, but are not limited to:

Recordings of all cameras for the duration of the show.

Recordings of all audio sources and their mix level changes over the duration of the show.

All media clips played over the show, and their start and stop times.

All cuts, and their respective times.

All transitions and/or wipes with their times and the exact information to reproduce them.

All special effects, for example Chroma key or picture in picture, and their controlling data.

All graphics and/or titles played, and time stamped data parameters fed to them.

Such a live and post workflow system may have significant benefits in preparing and working with motion graphics media, including:

1. Mistakes in the live production video can be easily fixed in post (i.e., incorrect text in a title card, cuts to the wrong camera, etc.)
2. Creation of edited and condensed versions of the broadcast can be easily accomplished.
3. It can offer a fast work flow for creating canned productions, such as tutorials, even when there is no intention to broadcast live.

Figure 2:
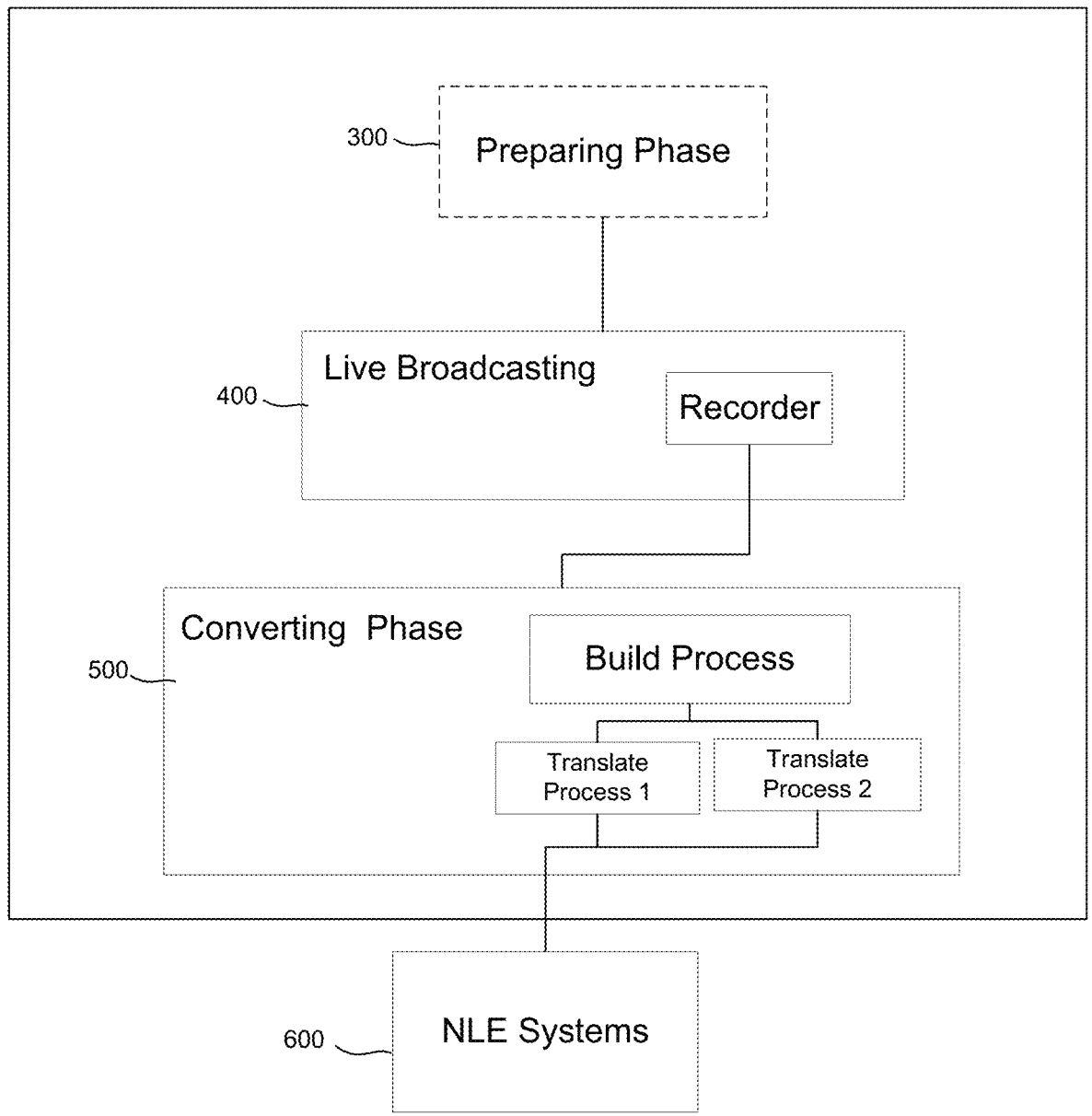
FIG. 2 illustrates a live and post workflow for generating a live production media and completely reconstructing all of the elements of the production media in post-production, according to an embodiment.

FIG. 2 illustrates a live and post workflow 200 for generating a live production media and completely reconstructing all of the elements of the production media in post-production, in accordance to an embodiment. The live and post workflow 200 may include, for example, four phases: 1) Preparing Phase 300, 2) Live Broadcasting/Recording Phase 400, 3) Converting Phase 500, and 4) Editing Phase 600.

Each of the four phases in the live and post workflow 200 engage and execute handling operations and actions of all video, audio, graphics and media in the production media, including:

1. Preparing Phase 300. Set-up for the Broadcasting Phase 400 by assembling and configuring all production media components, including, but not limited to:
   a. Video and audio sources (i.e., cameras and microphones)
   b. Titles & graphics.
   c. Media clips.
   d. Video effects processors.
   e. Audio effects processors.
   f. Transition effects processors.
   g. Transition graphics and media clips.
   h. Video and audio compositor/mixer.
   i. Routing between all components.
2. Broadcasting/Recording Phase 400. Run the live broadcast.
   a. Capture all incoming video and audio to media files.
   b. Record all user actions and incoming data events that manipulate the components.
3. Converting Phase 500. Process all of the media and actions and build a complete reconstruction of the performance in a Non-Linear Editing (NLE) system timeline.
4. Editing Phase 600. Edit the production in the NLE system.

In the following four phases presented herein below and in the figures, each of the four phases in the live and post workflow 200 are described and illustrated showing examples of component configurations and set up of each of the four phases. These examples are not intended to limit the invention in scope to such component configurations and set up, providing mere implementations of the invention in a practical application by a user.

Organization and Implementation Concepts

In the live and post workflow 200 system, the organization and implementation of this invention may summarized by two concepts: Components and Recorder.

Components. Every element in the live production is a component. These can be hardware or software devices. They include all the elements listed above, plus two additional components necessary for the live broadcast:

The Media Mixer. This is the heart of the production and it dynamically mixes the incoming video and audio, cutting between cameras, layering on graphics and media, and mixing audio.

The Router: The video and audio connections between all the components as well as the Media Mixer are managed by the Router component.

Recorder. The Recorder is central to live and post workflow 200 system, providing a standard mechanism for all components to record their configuration and actions during the live broadcast. The recorded data may be then used to reconstruct the entire production for editing in the NLE system.

Example of the Live and Post Workflow System

Figure 3:
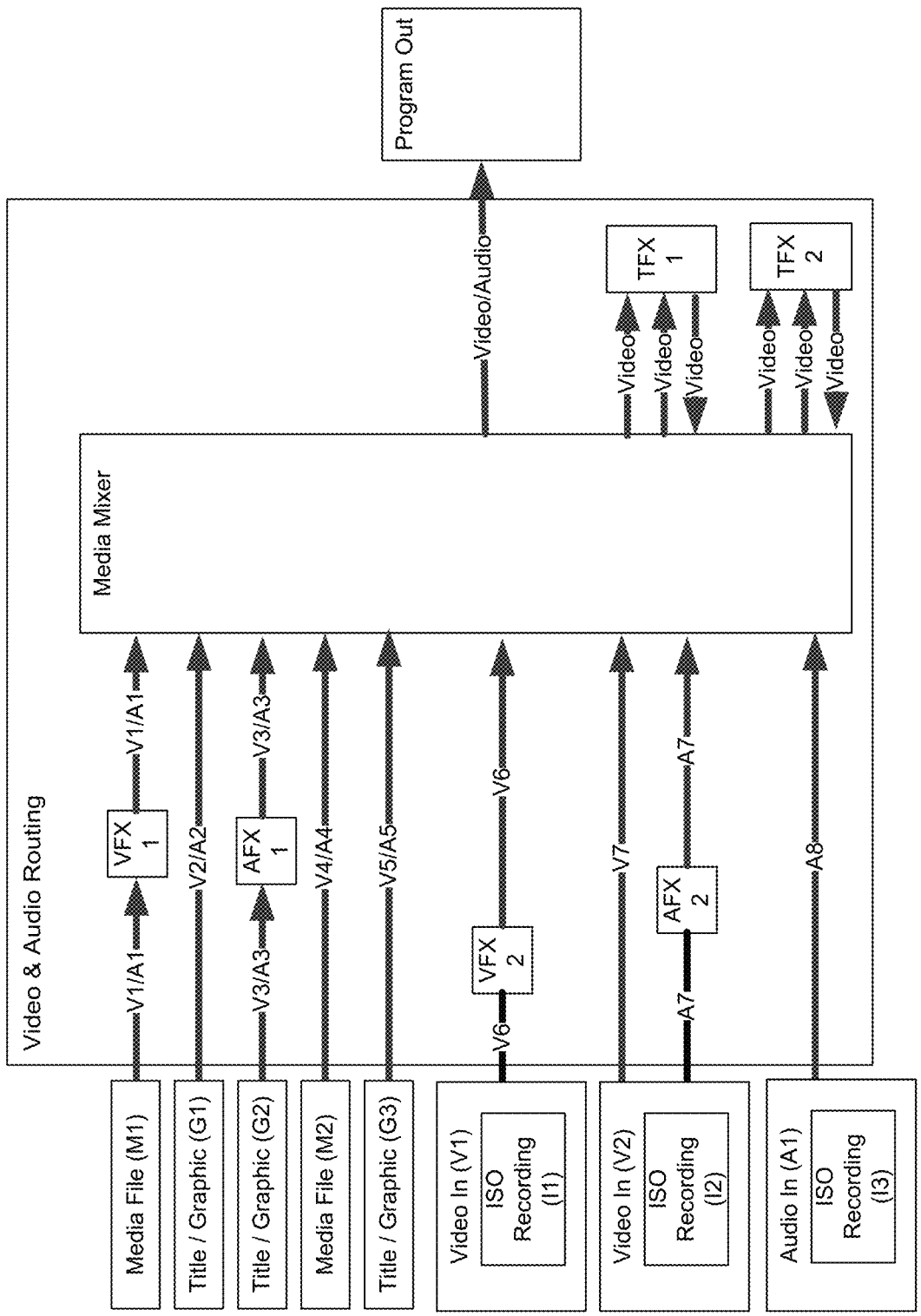
FIG. 3 illustrates the Live Broadcast Component Organization and some examples of a typical workflow using these components in the Live and Post Workflow System are provided, according to an embodiment.

Some examples of a typical workflow using these components in the Live and Post Workflow System 200 are provided in FIG. 3 which illustrates the Live Broadcast Component Organization.

Media File (M1): A video clip with audio and video.

Video Effect (VFX 1): A video effect to apply to M1 during playback.

Title/Graphic (G1): A motion graphics title with alpha transparent image and audio.

Title/Graphic (G2): A motion graphics title with alpha transparent image and audio.

Audio Effect (AFX 1): An audio effect to apply to G2 during playback.

Media File (M2): A video clip to play over transitions.

Title/Graphic (G3): A title graphic to play over transitions.

Transition Effect (TFX 1): A transition effect to create a wipe between two video inputs.

Transition Effect (TFX 2): A second transition effect.

Video In (V1): A live video feed from a camera.

Video Effect (VFX 2): A video effect to apply to the live camera.

Video In (V2): A second live camera feed, also with audio.

Audio Effect (AFX 2): An audio effect to apply to the audio from V2.

Audio In (A1): A live audio feed.

Media Mixer: Live video and audio switcher/compositor/mixer.

Audio and Video Routing: Audio and Video connections between all the above components.

Preparing Phase

Figure 4:
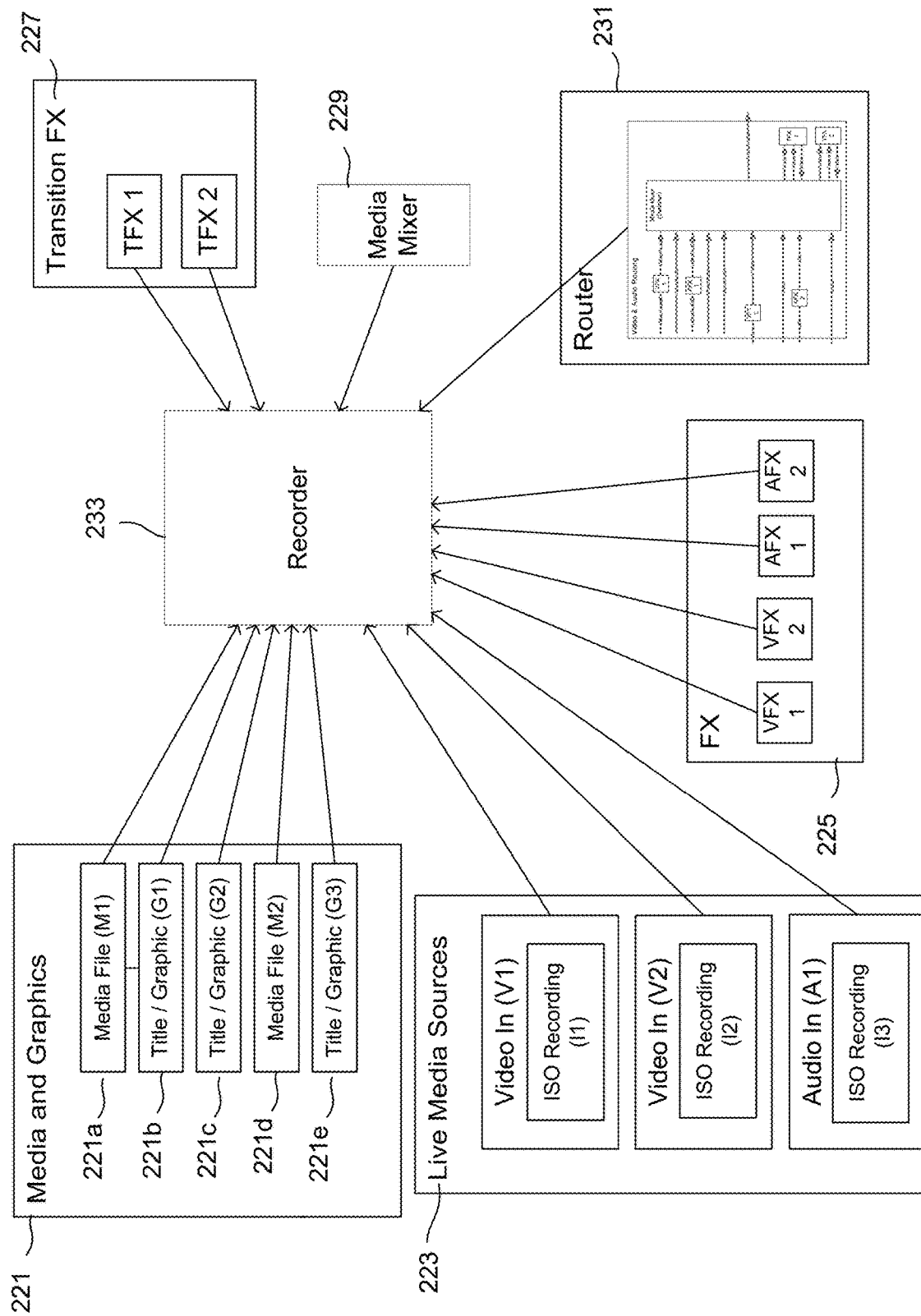
FIG. 4 illustrates a block diagram and media data processing, components, a recorder device, and flow in the Preparing Phase of the live and post workflow, according to an embodiment.

FIG. 4 illustrates a block diagram and media data processing, components, a recorder device, and flow in the Preparing Phase 300 of the live and post workflow 200, in accordance to an embodiment. In the Preparing Phase 300, the user may be presented with a set of configuration options via a user graphical user interface to prepare each component for the performance. The user graphical user interface may include software interfaces as well as hardware interface device, while the components may include, but are not limited to:

Media and graphics elements 221

Live video and audio sources 223

Video and audio real time effects 225

Transition effects 227

Media Mixer 229

Video and audio Router 231 between components and the Media Mixer 229

Recorder device 233

Media and Graphical Elements

In the Preparing Phase 300, the Media and Graphical Elements 221 may receive inputs by the user to set up media sources for dynamic playback during the performance in, according to an embodiment. These elements may be composed primarily of video clips, audio clips, and title graphics.

As shown in FIG. 4, components may be arranged in a top to bottom layer order, according to one implementation, as follows:

M1: This may include a media file having, for example, a video and audio file.
  set it to a trigger state so it can be triggered manually during the broadcast. For example, the switcher may be set up with this clip and when the user presses a button or clicks on the mouse to do the cut, it can trigger the clip to play. For example, the full sequence of steps for such a cut may include 1) start the clip playing over the video; 2) at the middle point, switch video sources; 3) when the clip finishes playing, complete the step. Note that this style of transition may also be called a "stinger"
  Since this object is stacked at the top, M1 will play over all other graphics and media that may be obstructing them. The order of objects in the media and graphics list determines how they "stack" on top of each other, like from the bottom up to the top, for example.

G1: This may include a title graphic such as a lower third that provides information about a person, an object, or scene, event, etc.
  G1 may be connected or receive input data from a spreadsheet source file.
  G1 may receive its data for name and image from the spreadsheet.

G2: This may include another title graphic,
  G2 may be connected to or may receive input data from a live data source.
  G2 receives live data such as a score, game status, and clock data from a hardware scoreboard or other data input from a ticker tape, weather indicator or other real-time changing data source.

M2: This may include another media file, such as a very short clip, intended to be used for transitions.
  may be marked as a transition clip, another example of the stinger.

G3: This may include another title graphic,
  may be quick and used as a transition wipe.
  may be marked as a transition graphic.
  may be connected to a data source, such as for example, team names and current score so that every time the graphic plays it will display the team and current score.

Live Video and Audio

In the Preparing Phase 300, the Live Video and Audio 223 component may receive inputs from the user to set up the live camera and audio inputs, according to an embodiment, as follows:

V1: may include a video camera, no audio.
  This may be set to record to an ISO file, I1.

V2: may include another camera, with audio.
  may be set to record to an ISO file, I2.
  may set the mix level for the audio.

A1: may include an independent audio source (i.e., a microphone.)
  may be set to record to an audio ISO file, I3.
  may set the mixing level of the audio source.

Effects

The user may set up any real time effects, FX 225 and Transition FX 227 components, in the Preparing Phase 300. These effects may include frame buffer effects for video and waveform effects for audio. In this workflow system, the user may set the real time effect, just as they would in the NLE. They may choose a transition from a palette of available transitions and then set parameters for it. These transitions may include transition plugins found in many NLE systems. Importantly, these may be all implemented as real time processors, either in hardware or software (via the CPU or GPU). These effects must have an exact equivalent match with a software or hardware plugin in post-production so that they can be first used in the live broadcast and then later inserted in the editable project. In the optimal scenario, these are indeed the exact same component (or software video FX plugin.)

In the Preparing Phase 300, the real time effects in the FX 225 and Transition FX 227 components may be set up as follows:

Create a video effect, VFX 1, such as for example, a soft glow, which may be applied to the media file M1.
  insert a video signal path between M1 and the Media Mixer 229. In this system, the user may choose the effect and assign it to the media file, where the actual insertion in the video signal is then handled by the live and post workflow 200 system.

Create an audio effect, AFX 1, a strong reverb, applied to Graphic G2.
  insert the audio signal path between G2 and the Media Mixer 229. For example, the user may select the audio effect, assigning it the graphic while the live and post workflow 200 system may insert it in the audio signal path.

Create a video effect, VFX 2, for example, a Chroma key.
  insert in the video from V1. For example, the user may choose the effect, assigning to the specific video input.
  set the Chroma key parameters.

Create an audio effect, AFX 2, as a time a compressor limiter, for example.
  insert the audio coming from V2.
  set the effect parameters including, for example, a number of parameter settings for audio effect control parameters.

Create a transition effect, TFX1, such as for example, a simple wipe left to right transition.
  place in the switcher or Media Mixer 229.
  set the transition effect parameters, including a number of parameter settings for transition effect control parameters.

Create a transition effect, TFX2.
  place in the routing, so it can connect to the switcher or Media Mixer 229.
  set the transition effect parameters.

Media Mixer and Routing

The Media Mixer 229 in the Preparing Phase 300 may receive and accept video and audio input, combining them in real time to generate a mixed video and audio output, while the Router 231 component may simply connect all of the components to the Media Mixer 229.

Figure 5:
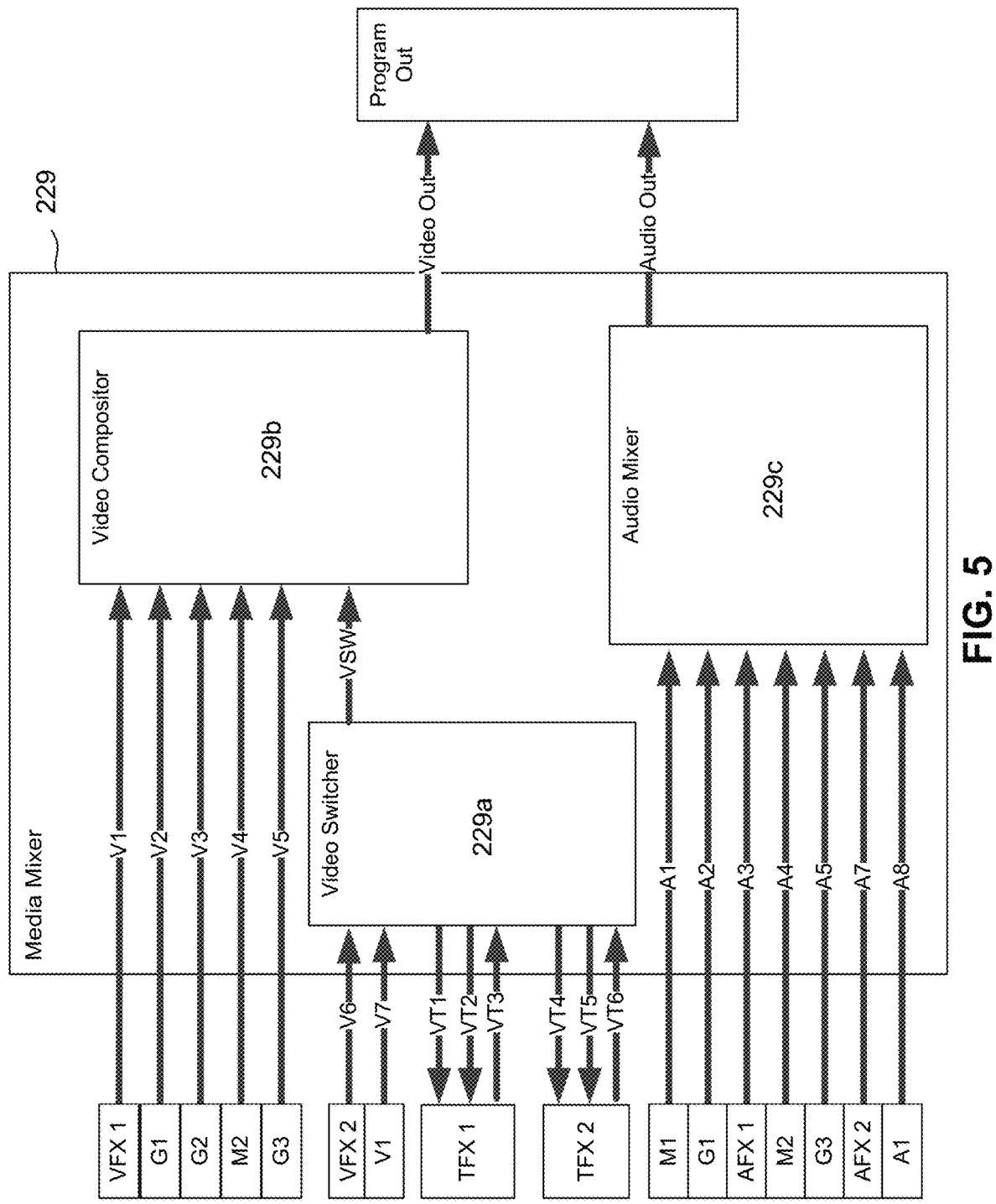
FIG. 5 illustrates the Media Mixer component which may be composed of three interior parts, including a Video Switcher, a Video Compositor, and an Audio Mixer, according to an embodiment.

FIG. 5 illustrates the Media Mixer 229 component which may be composed of three interior parts, including a Video Switcher 229*a*, a Video Compositor 229*b*, and an Audio Mixer 229*c*, according to an embodiment. In one application, the Media Mixer 229 may operate as follows:

The Video Switcher 229a may receive one or more live video inputs and selects which to pass through to the Compositor.

In addition to cutting directly between video feeds, the Video Switcher 229a can also provide timed wipes between shots, either automatically or under manual control. These wipes include:

Transition effects TFX 1 and TFX 2.

Media transitions M2 and G3, which it triggers to play layered over the video, with the cut occurring in the middle of the transition, when the underlying video is obscured.

The Video Compositor 229b may receive the layered media elements in the top to bottom order. Each element may specify a compositing operation, or default to alpha blended. At the bottom of the composition layers is the output of the switcher. Note, the switcher output can be interleaved between other media elements, if desired.

The Audio Mixer 229c may receive all the audio feeds coming from both live audio and media elements of the Media Graphics and Live Media Sources. In the minimal case, it applies volume and pan settings to the audio, though other options such as mute and solo buttons can automate the control of the mix in convenient ways.

With these components and elements all configured and defined in the Preparing Phase 300, the live and post workflow 200 is now ready for the broadcasting phase 400 as described in the next section.

Broadcasting/Recording Phase

Figure 6:
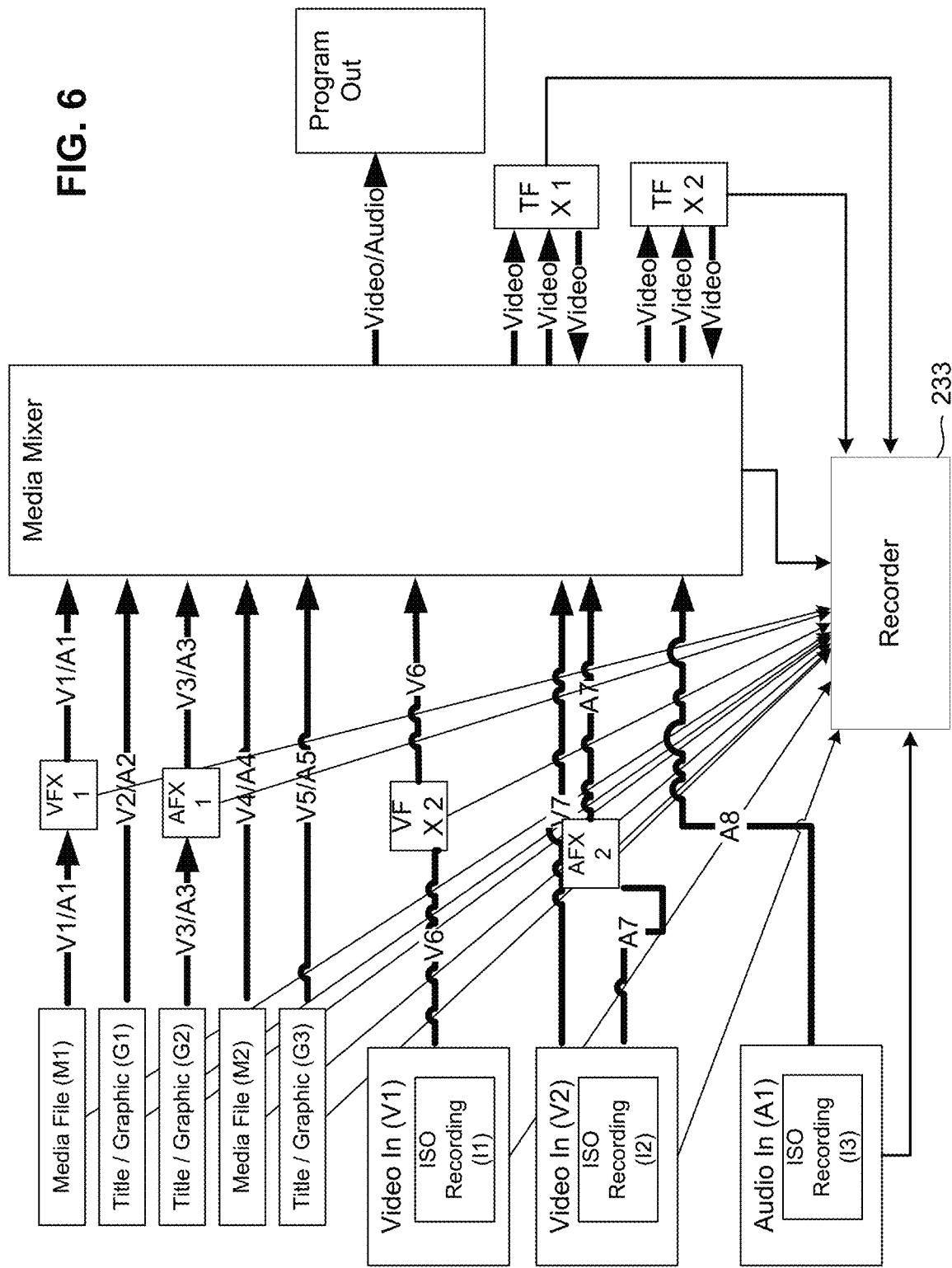
FIG. 6 illustrates a block diagram and media data processing, components, and flow during the Broadcasting/Recording Phase of the live and post workflow, according to an embodiment.

FIG. 6 illustrates a block diagram and media data processing, components, and flow during the Broadcasting/Recording Phase 400 of the live and post workflow 200, in accordance to an embodiment. In the Broadcast portion of the Broadcast/Recording Phase 400, the prepared project, which was previously defined and configured in Preparing phase 300, may be applied to the Broadcast phase to generate a live production. During the broadcast phase, all live audio and video may be recorded to file and all user actions are recorded so that they can be reconstructed and edited at a later time in the NLE system. In the Broadcasting/Recording Phase 400, the Recorder 233 may be configured to manage the recording of all activity during the broadcast and exposes a mechanism to receive events from each component during the broadcast, allowing each component to record its activities so that they may be reconstructed at a later time.

In the calls to the Recorder 233, a caller or sending component may identify the component, including all the Media Graphics, Live Media Sources, FX components, by name in an asynchronous, loosely bound call. The sending component is a component that may call an API of the recorder to send it something to record. In application, it may be a function call as implemented in software. In this way, one component may record activities that can be bound to another component. For example, the Media Mixer component might record audio mix level changes and assign them to the source audio component so that these audio level changes will be attached directly to it.

Figure 7:
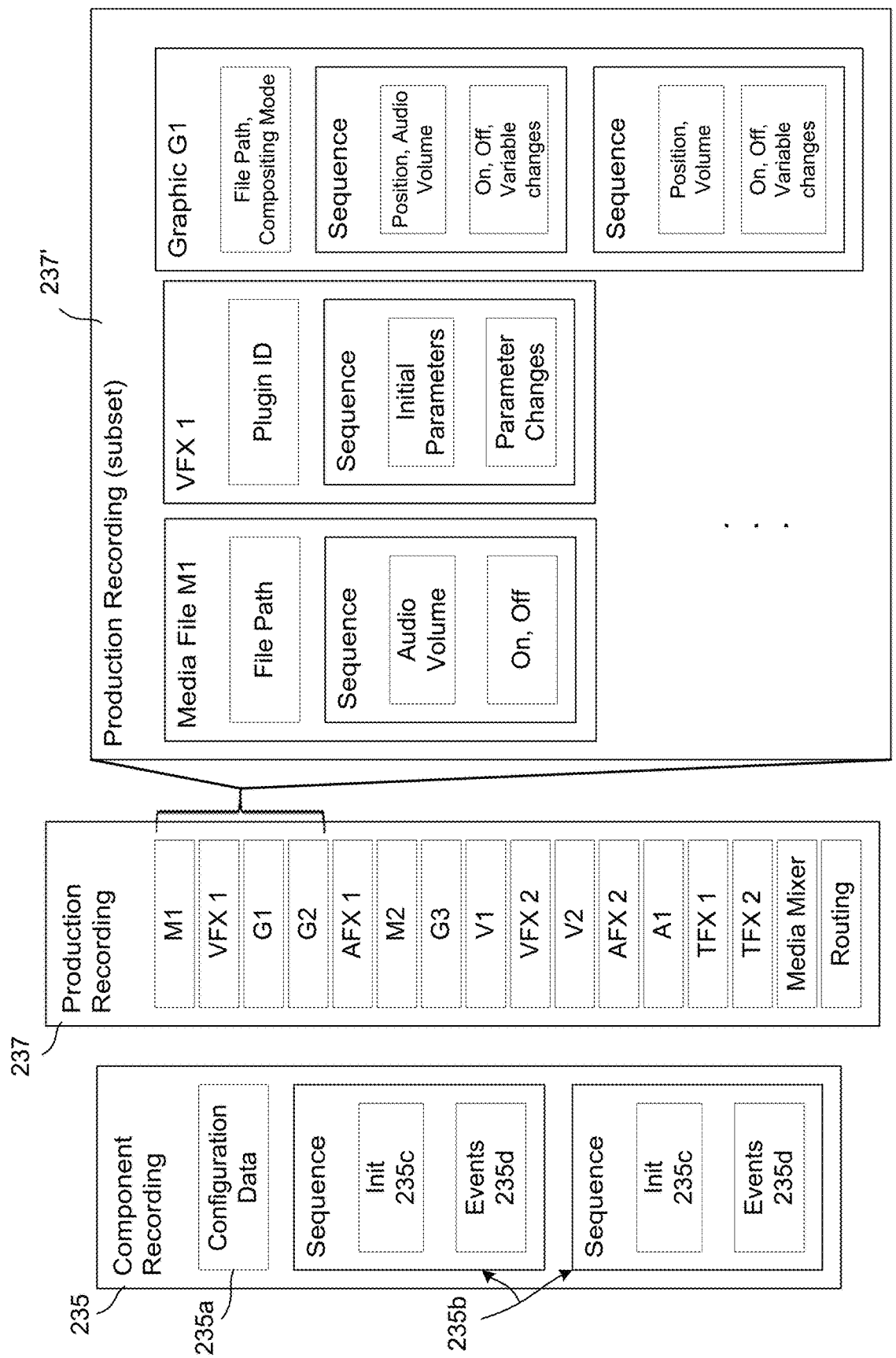
FIG. 7 illustrates an example organization and block diagram of Component Data Storage in the Recorder, according to an embodiment.

FIG. 7 illustrates an example organization and block diagram of Component Data Storage in the Recorder 233. In this example, the Recorder 233 may separate and split apart the information down into a hierarchy of Components, Sequences, and Events in a Component Recording 235, according to an embodiment.

The Component Recording 235 may represent an individual component, whether it may be a video input, title graphic, or transition effect. Each Component may also provide a unique name, which the Recorder 233 then uses to track subsequent activity. Each component, when it makes a call to the Recorder 233, may send the Recorder 233 the component name, so the Recorder 233 knows what to associate this information with. This also means that one component can record information about another, if necessary. The user may determine an appropriate place in the code to insert the call. In this implementation, it may appear in different places for different components and actions. So, it is important that the call to the Recorder 233 is global in scope and simple. There is no direct binding between the caller and the Recorder 233, so the caller may need to convey for which component the data is applied.

Within each Component Recording 235, the Recorder 233 stores:

A Component Configuration Data 235a. This is all parameters that are set up at initialization. For example, for a graphic, it could hold the file path and size and placement parameters.

One or more Performance Sequences 235b, each for a distinct segment in time where the component is actively used. For example, with a graphic, each sequence corresponds with each time the title plays.

Within each Performance Sequence, the Recorder 233 stores:

Initialization data 235c. This may include the time as well as any parameters that are set once for playback.

Event list of individual Actions 235d. In the graphic example (Title Graphic G2), these could be text changes (i.e., clock digits) or continuous controller information (i.e., motion, audio mix levels).

Also shown in FIG. 7 is a Production Recording 237 which is a representation of the entire recording of the productions of all component recordings (M1, VFX 1, G1, G2, etc.). To manage the recording in the Broadcasting/Recording Phase 400, each component directly communicates with the Recorder 233 in the Production Recording 237 with a series of commands that is configured to Initialize Component—creating a new component, give it a unique name, and set up its configuration data.

Start Sequence—activating a sequence for the named component and provide its initialization data.

Record Event—recording time stamped data in the currently active sequence of the component.

Stop Sequence—finishing the current playing sequence.

As shown in a subset Production Recording 237' of the Production Recording 237, each sequence may be include a sequential list of events while each component may have a sequence of actions that occur when it is active. For example, an audio effect might have a volume parameter that moves up and down as the user changes it, causing it to get louder and quieter. A graphics component may have a series of numbers that may cause it to display new values in a clock, for example.

The time stamp of the action.

The name of the action.

A data package with all the parameters of the action.

Figure 8:
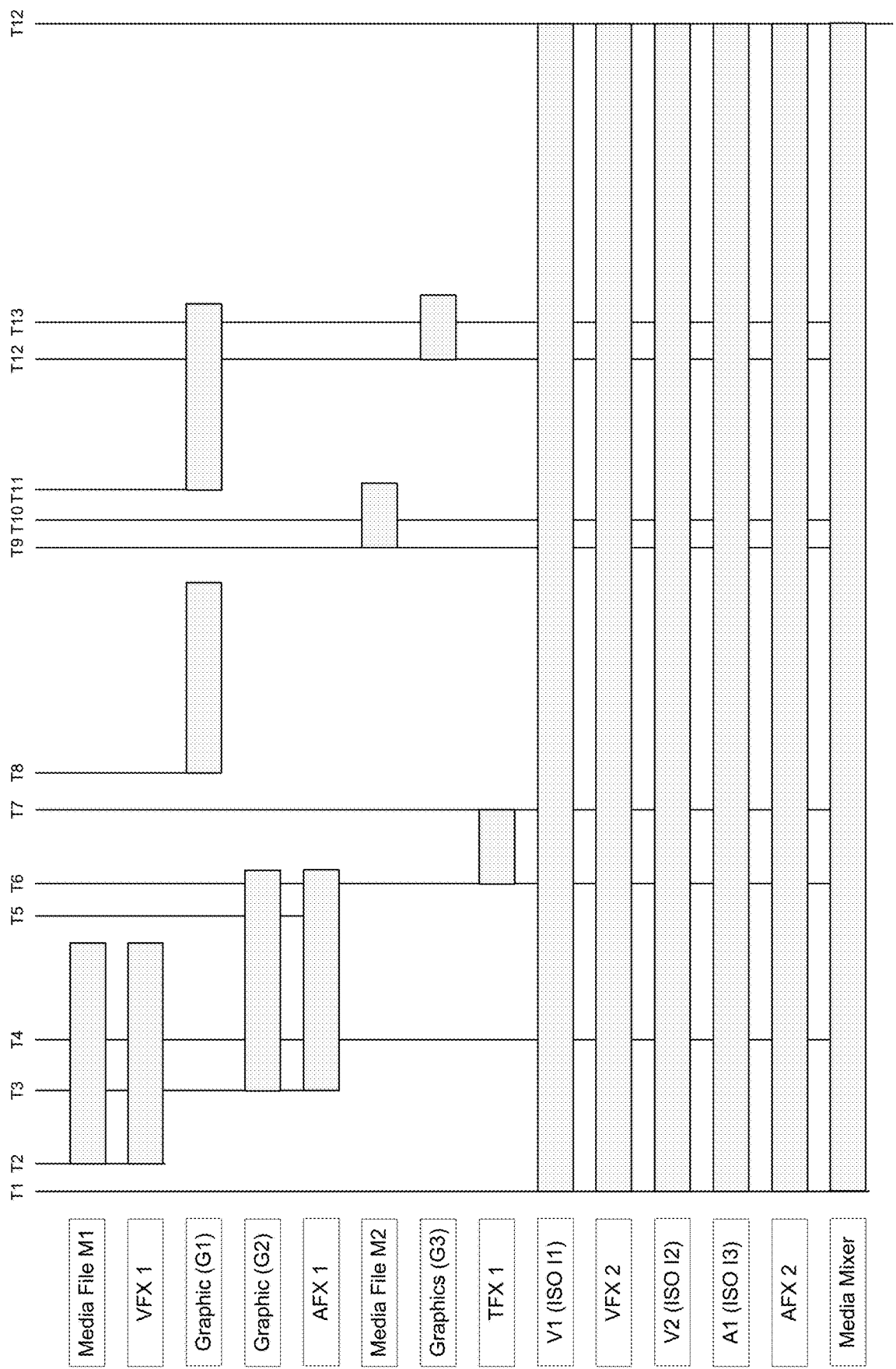
FIG. 8 illustrates an example of the Broadcasting Phase including a Broadcast Event Timeline, according to an embodiment.

FIG. 8 illustrates an example of the Broadcasting Phase including a Broadcast Event Timeline, according to an embodiment. A Time Flag (Tn) shown on the top row of FIG. 8 represents a time stamp in sequential order. Each Time Flag (Tn) may indicate a user action or mixer automation that can trigger sequencing in one or more components. For example, these steps and triggering events may include the following actions and events at each Tn:

T1: Start Recording
  V1 (ISO I1) Start recording.
  VFX 2 Activate for processing V1.
  V2 (ISO I2) Start recording.
  A1 (ISO I3) Start recording.
  AFX 2 Activate for processing A1.
  Media Mixer Cut to V1.
T2: Trigger playback of media file.
  Media File M1 Start playback.
  VFX 1 Activate for processing M1.
T3: Trigger playback of a graphic.
  Graphic G2 Fly in.
  AFX 1 Activate for processing G2.
T4: Switch to the V2 camera source.
  Media Mixer Cut to V2.
T5: Play out the graphic.
  Graphic G2 Fly out.
T6: Cut to V1, using TFX 1 Transition.
  Media Mixer Connect Transition TFX 1 and feed V2 and V1 to it.
  TFX 1 Start processing.
T7: Complete the transition.
  Media Mixer Disconnect Transition and switch to V1.
T8: Play a second Graphic, G1.
  Graphic G1 Fly in.
T9: Cut to V2 using a media clip transition.
  Media Mixer Trigger Media File M2.
  Media File M2 Start playing.
T10: Cut to V2
  Media Mixer Cut to V2.
T11: Play Graphic, G1.
  Graphic G1 Fly in.
T12: Cut to V1 using a graphic transition.
  Media Mixer Trigger Graphic G3.
  Graphic G3 Fly in.
T11: Cut to V1 (midpoint of graphic)
  Media Mixer Cut to V1.
T12: Finish Recording
  All Active Components: End Sequence.

Note that this timeline may only include the actual moments when a sequence was started or stopped. In addition, when a sequence is active, it is typically receiving time stamped events to reflect every parameter or data update that is currently modifying the live component.

Thus, in the above implementation, most of the components also may have event activity. A few examples include:
  A1 (ISO I3) Audio mix levels.
  Graphic G2 Text data changing the display of clocks and scores.

With the Broadcasting/Recording Phase 400 defined and completed, the following assets are now available in the live and post workflow 200, including but not limited to:
  1. Three recorded video files.
  2. All media and graphics assets that were used.
  3. A set of data recordings for all the components, with the following for each:
    a. Configuration information.
    b. For each activation of the component (i.e., moment in time when the component is actively running)
      i. Initial parameters.
      ii. Sequence of events that occur over time while the component is active, indicating anything that would modify it during playback.

Note that splitting each component's timeline into separate activation sequences is important for purposes of recreating in a NLE timeline. As an example, if a title is played multiple times, then each time it is played can show up on the timeline as an individual item, which makes editing much more natural to the user.

Figure 9:
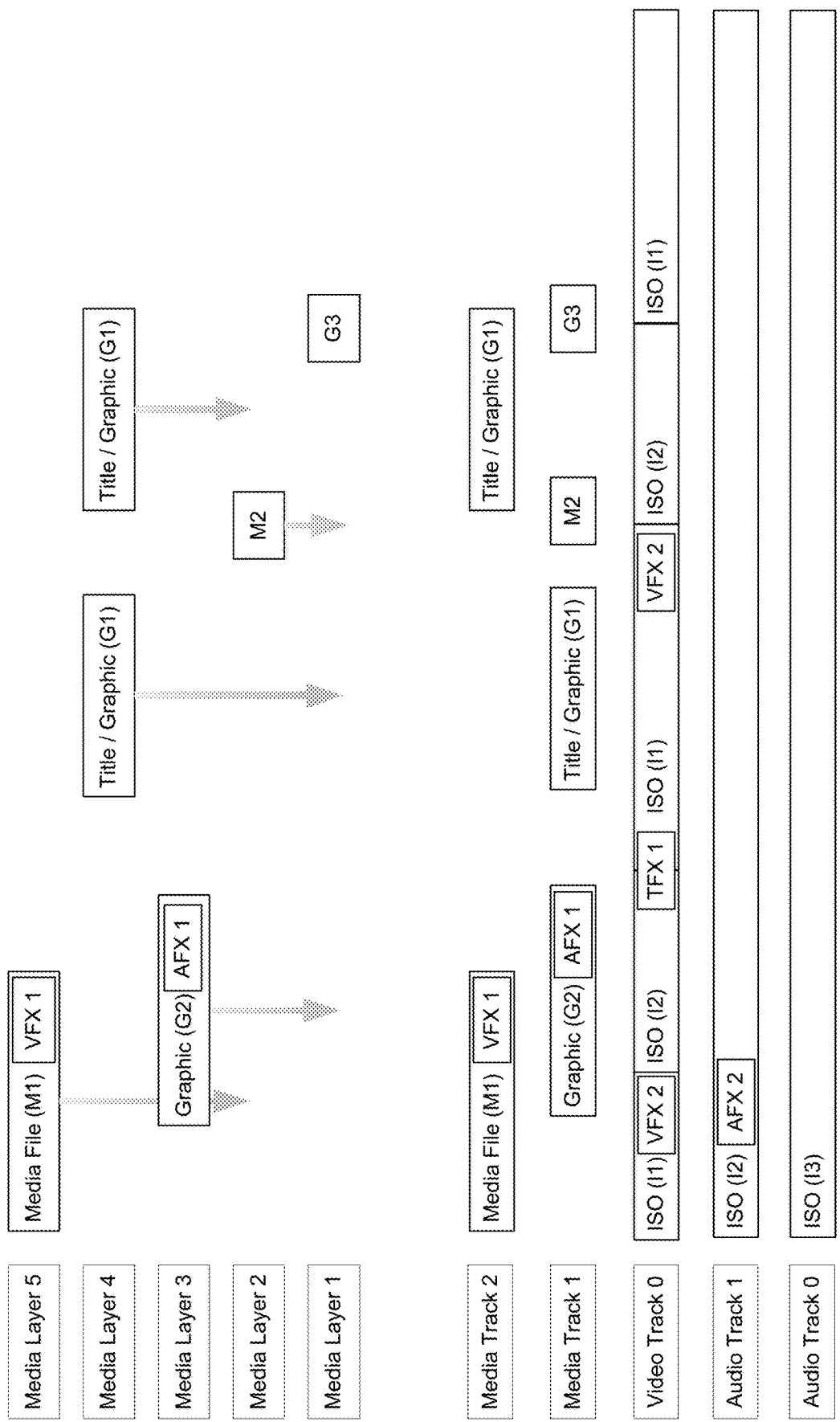
FIG. 9 illustrates an example of the Converting Phase, according to an embodiment.

FIG. 9 illustrates an example of the Converting Phase 500 which is the one part of the process of the other phases that requires minimal user interaction, according to an embodiment. In operation, the Converting Phase 500 includes an automated process taking the assembled components from the Preparing Phase 300, combining with the recordings and action list from the Broadcasting/Recording Phase 400, and then building a full project for editing in the NLE system of choice.

Operationally, the Converting Phase 500 may include two parts:
  1. Build a generic intermediate representation code of the project as a timeline with all the elements, to play in an NLE. The generic intermediate representation is a structure or document that is created by the converter.
  2. Translate the generic intermediate representation into a native format applicable for each specific NLE system.

Build Part of the Converting Phase

Figure 10:
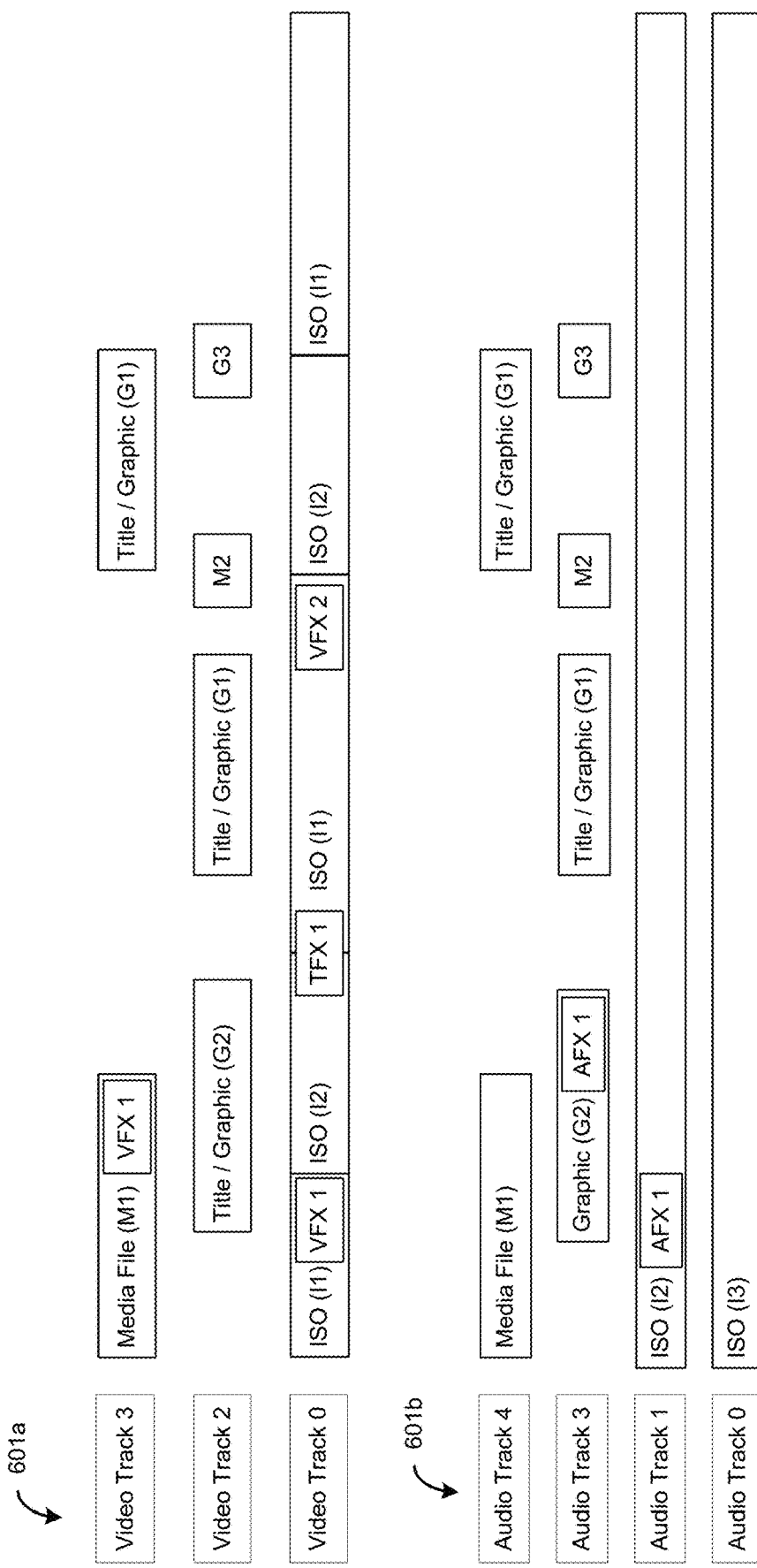
FIG. 10 illustrates the results from build part of the Converting Phase having been translated and ready for a specific NLE system, according to an embodiment.

FIG. 10 illustrates the results from build part of the Converting Phase 500 having been translated and ready for a specific NLE system, according to an embodiment. In this example, the build part converts the recorded broadcast in the Broadcasting/Recording Phase 400 into an NLE timeline representation, according to embodiment. As shown in FIG. 9, a timeline may be composed of one or more video tracks 601a and audio tracks 601b, where each track represents a series of media or graphic clips where each clip has:
  1. Reference to the media file (M1, M2, or M3) or graphic (G1, G2, G3).
  2. Timeline marker indicating when to start playback.
  3. Seek offset within the media file to align with the start time.
  4. Playback duration of the clip.
  5. Optional effects, where each effect is identified by its unique id and accompanied by parameter settings.
  6. Dynamic parameters, such as volume, pan, and opacity, which may change over time. Two examples:
    a. For a media clip, changes in the audio volume, if the user was mixing it up or down during playback.
    b. For a graphics clip, new data arriving to drive changes in the display (for example clock digits incrementing.)

Not surprisingly, each clip may carry the same information that the equivalent component sequence recorded during the broadcast in the Broadcasting/Recording Phase 400.

The build part of the Converting Phase 500 may also convert the recorded sequences and files into a timeline representation made up of tracks with references to clips.

Functionally, there are three parts to this conversion operation:
  1. Build a layered set of tracks with video/audio clips that represent all the video and audio assets (i.e. media clips, graphics) played during the performance.
  2. Build the underlying video track that represents the Media Mixer 229 switcher behavior, cutting between the live video inputs, per the switcher actions, and creating a connected series of clips, with overlaps for transitions.
  3. Build an associated underlying set of one or more audio tracks for the live audio inputs.

The Converting Phase 500 may also build layered media clip tracks. These tracks may hold all the clips, graphics, etc., that were dynamically played during the broadcast. Depending on the destination NLE in which the generic intermediate code is applied, these tracks may stay coupled together in the final edit representation, so we keep them in one place for now.

1. For each media and graphic object, create a list of layered media track, in the same order as in the Broadcast project.
2. Scan through component recordings, looking for clips.
   a. For each media or graphics sequence, insert as a clip on its matching layer. Each layer is an object that can hold one or more clips, but they cannot overlap.
   b. Scan through the component recordings for audio and video effects. For each effect sequence that maps to the media or graphics sequence, attach the effect sequence to the parent clip.
3. Once done go back and optimize for minimum number of tracks. The objective is to minimize the number of tracks so it will be more manageable in the NLE. To succeed, the tracks must observe two requirements: a) They must preserve their visual layer order. b) They must not overlap clips on the same track.

Here's how it works:
   a. For each track, starting at the lowest and working up:
      i. For each clip in the track:
         1. Compare the clip against the tracks below, starting at the bottom track.
         2. Find the lowest track that the clip will fit into without overlapping any other clips on that track.
         3. Move the clip to that track.
   b. Remove all empty tracks at the top.

Figure 11:
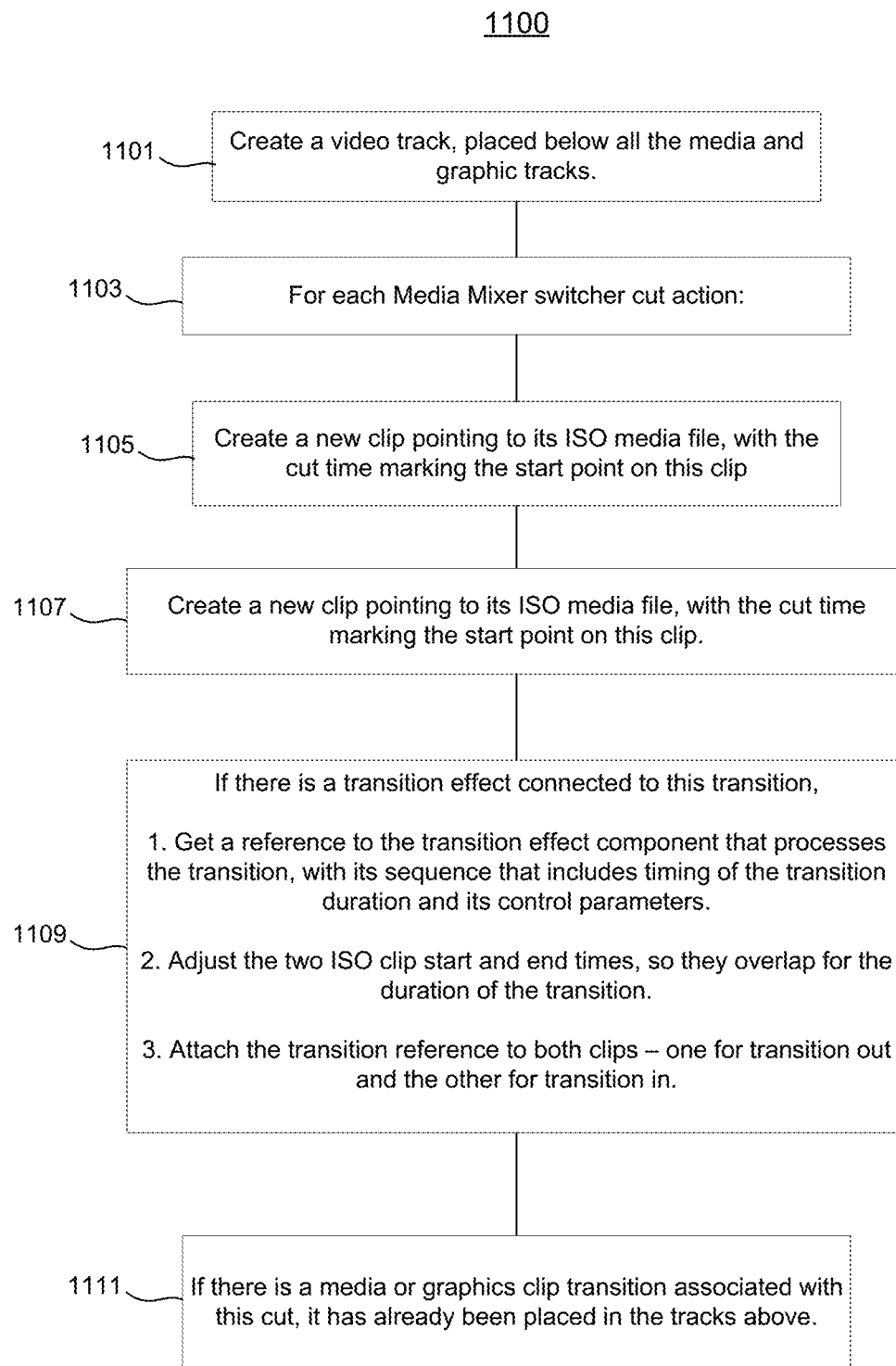
FIG. 11 illustrates the process for building one or more underlying video tracks for the live inputs, according to an embodiment.

Building the Video Track:

FIG. 11 illustrates the process for building one or more underlying video tracks for the live inputs (saved to ISO files) 1100, according to an embodiment. This video track may be composed of clips from the ISO recordings, spliced together with cuts and transitions. For example, the steps and process for building one or more underlying video tracks may include:

1. Create a video track, placed below all the media and graphic tracks 1101.
   a. For each Media Mixer switcher cut action 1103,
      i. Create a new clip pointing to its ISO media file, with the cut time marking the start point on this clip 1105.
      ii. If there was a prior clip, mark the end point (duration) on the prior clip 1107.
      iii. If there is a transition effect connected to this transition 1109,
         1. Get a reference to the transition effect component that processes the transition, with its sequence that includes timing of the transition duration and its control parameters.
         2. Adjust the two ISO clip start and end times, so they overlap for the duration of the transition.
         3. Attach the transition reference to both clips—one for transition out and the other for transition in.
      iv. If there is a media or graphics clip transition associated with this cut, it has already been placed in the tracks above 1111.

Figure 12:
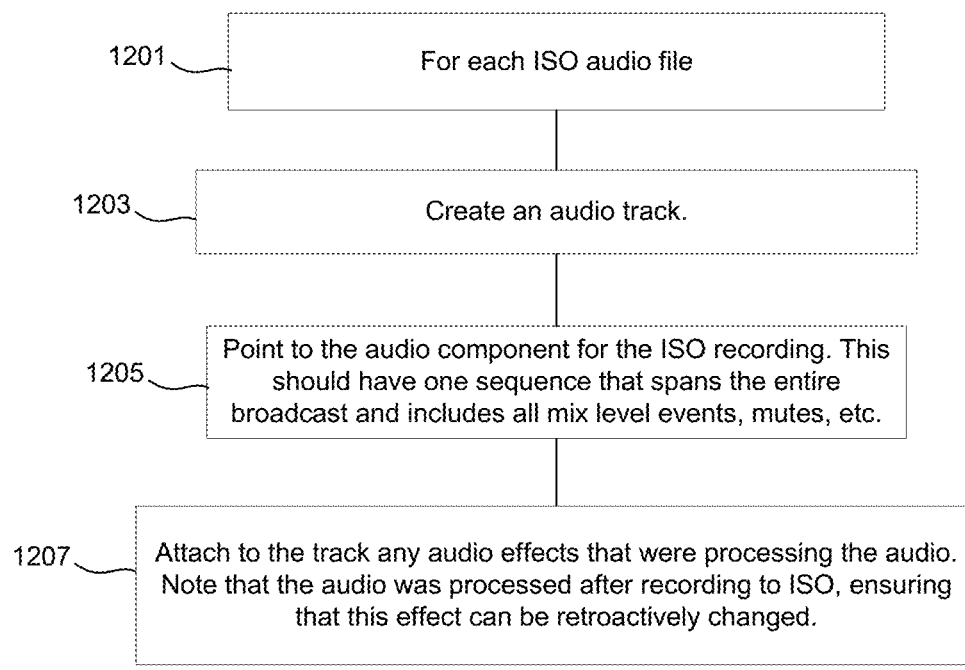
FIG. 12 illustrates the process for building the audio track for the live inputs, according to an embodiment.

Building the Audio Tracks:

FIG. 12 illustrates the process for building the audio track for the live inputs (saved to ISO files) 1200, according to an embodiment. In practice, building the audio track for the live inputs is a much simpler process as compared to building the video track. For example, the steps and process for building the audio track may include:

1. For each ISO audio file 1201:
   a. Create an audio track 1203.
   b. Point to the audio component for the ISO recording. This should have one sequence that spans the entire broadcast and includes all mix level events, mutes, etc. 1205.
   c. Attach to the track any audio effects that were processing the audio. Note that the audio was processed after recording to ISO, ensuring that this effect can be retroactively changed 1207.

Translate of the Converting Phase

The final stage of the Converting Phase 500 is to take the generic intermediate project and translate it into the native format defined by the NLE system 600 for importing a project.

There are two methods to this, depending on the NLE system 600 to which it is applied:

1. If the NLE system 600 file format is completely documented and understood, create a complete file in the known format of the NLE, with all embedded sequenced parameters, etc., translated into the native file format.
2. Or, if the NLE system 600 provides an SDK or API for importing a project into the NLE system 600, create such an importer that interprets the intermediate format and makes the appropriate calls into the API to reconstruct the object in the native format.

After successfully translating the generic intermediate project into a native format of the NLE system 600, verification that all components are reproduced in highly exact ways is required, so that the resulting project is immediately usable by the NLE system.

With that in mind, below is a summary of some of some conditions and mechanisms to address each condition by the live and post workflow 200 system:

Media clips. (including the ISO recorded files) Fortunately, these are all standardized around known codecs and file formats, so the requirement is purely to make sure that the recorded formats for ISO recording and clips are also supported by the NLE system. And, all NLE importers have mechanisms for setting the start times and durations of media clips.

Audio mixing. Audio mix levels must be in a known, translatable format, i.e., decibels. If the NLE API does not support setting audio mix levels, then the importer must provide a workaround. This can be an audio effect (i.e., VST) that implements the mixing nondestructively so the user can change it.

Video compositing. All NLE systems support a reasonable number of video tracks that can be layered exactly as defined by the intermediate format and so it is rare to have a production that overloads with too many graphic overlays.

Effects. The best approach with effects (including audio as well as transition effects) is to use the exact same design/technology in both live and post. This means that the effect's underlying code is shared for both implementations and the parameters are the same. All NLEs have standard plugin APIs for managing effects, so the solution is to take the implementation of the effect, as used in the live platform, and create an NLE plugin implementation of it.

Titles and Graphics. Even more so than effects, graphics are highly specialized, and the same technology needs to be available for interpreting and rendering a graphic both in the live and post implementations. Again, the solution is to implement a plugin in the NLE that is built on the same graphics engine as used in the live broadcast. It can read the design as well interpret the sequence of data changes that update the display during playback.

In this implementation, there may be the exact same technologies for rendering graphics and effects in both live and post. In addition, all components described in the Live and Post Workflow System 200 listed above can be implemented in hardware or software, or a combination of both hardware and software.

All patents, patent applications, and other references cited herein are incorporated by reference in their entireties.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. A live and post workflow system for generating a media project of a live production media including graphics media and fully reconstructing all graphical elements and all graphical events of the live production media for a post-production environment, the live and post workflow system comprising:
   a live broadcasting component for controlling a live broadcast and recording graphic data information and graphic events via a recorder, including capturing all incoming video and audio to one or more media files, and recording all user actions and incoming data events that manipulate a plurality of production media components within the live and post workflow system; and
   a converting phase component for processing and building a generic output from the one or more media files, user actions, and incoming data events and then translating and reconstructing the generic output into a complete reconstruction of the live broadcast having a generic output format and a timeline that is supported by the post-production environment.

2. The live and post workflow system of claim 1 further comprising a preparing phase component, wherein the preparing phase component is configured to set-up for the live broadcasting component by assembling and configuring all of the plurality of production media components.

3. The live and post workflow system of claim 1, wherein the plurality of production media components include video and audio sources, titles and graphics, media clips, video effects processors, audio effects processors, transition effects processors, transition graphics and media clips, media compositors, a media mixer, a router, or any combination thereof.

4. The live and post workflow system of claim 3, wherein the media mixer dynamically mixes incoming video and audio, cutting between one or more cameras, layering on the titles and graphics, and media clips, and mixing the audio.

5. The live and post workflow system of claim 3, wherein the media mixer includes a video switcher, a video compositor, and an audio mixer.

6. The live and post workflow system of claim 3, wherein the router manages video and audio connections between all of the plurality of production media components and the media mixer.

7. The live and post workflow system of claim 3, wherein the converting phase component is configured to build a layered set of tracks having video and audio clips that represent all video and audio assets played during a performance of a live production, build one or more underlying video tracks that represents a media mixer behavior, and build an associated underlying set of one or more audio tracks.

8. The live and post workflow system of claim 1, wherein the recorder provides a standard mechanism for all of the plurality of production media components to record their configurations and actions during the live broadcast in a recorded data file.

9. The live and post workflow system of claim 8, wherein the recorded data file is used to reconstruct the live broadcast for editing in the post-production environment, wherein the post-production environment includes a Non-Linear Editing System.

10. The live and post workflow system of claim 8, wherein the recorder includes a component data storage for storing a hierarchy of media components, sequences, and events in a component recording.

11. A method for generating a media project of a live production media including graphics media and fully reconstructing all graphical elements and all graphical events of the live production media for a post-production environment by a live and post workflow system, the method comprising:
    controlling a live broadcast via a live broadcasting component;
    recording, via a recorder, graphic data information and graphic events, including capturing all incoming video and audio to one or more media files, and recording all user actions and incoming data events that manipulate a plurality of production media components within the live and post workflow system;
    building a generic output, via a converting phase component, from the one or more media files, user actions, and incoming data events; and
    translating and reconstructing the generic output, via the converting phase component, into a complete reconstruction of the live broadcast having a generic output format and a timeline that is supported by the post-production environment.

12. The method of claim 11 further comprising assembling and configuring all of the plurality of production media components, including graphics, prior to recording, by a preparing phase component.

13. The method of claim 11, wherein the plurality of production media components include video and audio sources, titles and graphics, media clips, video effects processors, audio effects processors, transition effects processors, transition graphics and media clips, media compositors, a media mixer, a router, or any combination thereof.

14. The method of claim 13, wherein the media mixer dynamically mixes incoming video and audio, cutting between one or more cameras, layering on the titles and graphics, and media clips, and mixing the audio.

15. The method of claim 13, wherein the media mixer includes a video switcher, a video compositor, and an audio mixer.

16. The method of claim 13, wherein the router manages video and audio connections between all of the plurality of production media components and the media mixer.

17. The method of claim 13, wherein the converting phase component is configured to build a layered set of tracks having video and audio clips that represent all video and audio assets played during a performance of a live production, build one or more underlying video tracks that represents a media mixer behavior, and build an associated underlying set of one or more audio tracks.

18. The method of claim 11, wherein the recorder provides a standard mechanism for all of the plurality of production media components to record their configuration and actions during the live broadcast in a recorded data file.

19. The method of claim 18, wherein the recorded data file is used to reconstruct the live broadcast for editing in the post-production environment, wherein the post-production environment includes a Non-Linear Editing System.

20. The method of claim 18, wherein the recorder includes a component data storage for storing a hierarchy media components, sequences, and events in a component recording.

* * * * *